United States Patent [19]

Hendy

[11] 4,241,144

[45] Dec. 23, 1980

[54] ANTISTATIC POLYOLEFIN FILMS

[75] Inventor: Brian N. Hendy, Welwyn, England

[73] Assignee: Imperial Chemical Industries Limited, London, England

[21] Appl. No.: 25,600

[22] Filed: Mar. 30, 1979

Related U.S. Application Data

[63] Continuation of Ser. No. 762,166, Jan. 24, 1977, now Defensive Publication No. T961,009.

[30] Foreign Application Priority Data

Feb. 6, 1976 [GB] United Kingdom ............... 4769/76
Apr. 9, 1976 [GB] United Kingdom ............. 14547/76

[51] Int. Cl.³ .................... B32B 27/32; B32B 27/08
[52] U.S. Cl. ................................. 428/516; 428/910; 428/520; 428/523; 252/8.8; 252/8.75
[58] Field of Search ............. 428/910, 516, 520, 523; 252/8.8, 8.75

[56] References Cited

U.S. PATENT DOCUMENTS

| | | | |
|---|---|---|---|
| 2,832,697 | 4/1958 | Walles | 428/516 |
| 2,897,170 | 7/1959 | Gruber | 428/375 X |
| 4,117,193 | 9/1978 | Tsuchiya et al. | 428/516 X |

*Primary Examiner*—George F. Lesmes
*Assistant Examiner*—E. Rollins Buffalow
*Attorney, Agent, or Firm*—Cushman, Darby & Cushman

[57] ABSTRACT

Oriented polyolefin (especially polypropylene) film having antistatic properties is produced by applying to the cast extrudate a solution of an 'Ethomeen' sulphate (e.g. 'Ethomeen' T/12 sulphate) before heating and stretching the extrudate to orient it. The corresponding hydrochlorides are not effective.

Inclusion of a quaternary ammonium compound, such as choline chloride, in the solution confers improved antistatic properties.

3 Claims, No Drawings

ANTISTATIC POLYOLEFIN FILMS

This is a continuation of application Ser. No. 762,166 filed Jan. 24, 1977 now defensive publication No. T961009 published Apr. 5, 1977.

This invention relates to polyolefin film and in particular to antistatic, polyolefin film.

By an "antistatic film" is meant a treated film exhibiting a reduced tendency, relative to an untreated film, to accumulate static electricity on a surface thereof.

Oriented polyolefin film is made by extruding polymer in the form of a sheet or tube ("cast extrudate") which is then heated and stretched to produce oriented film. A tubular extrudate may be heated and stretched as a tube by the bubble process, and a flat extrudate may be stretched using a stenter. It is possible to provide the oriented film with antistatic properties by incorporating certain antistatic agents into the polymer from which the film is made, but it is more effective in some instances if the antistatic agent is applied to the surface of the film.

Accordingly, the present invention provides a polyolefin film having on at least one surface thereof an amine sulphate of general formula

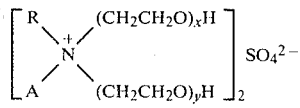

wherein x is a positive integer, y is zero or a positive integer, the sum of x and y is from 2 to 5, A is a hydrogen atom and when y is zero A may also be a lower alkyl group, and R is a univalent aliphatic radical containing from 8 to 22 carbon atoms.

The invention further provides a method of producing an antistatic polyolefin film comprising extruding a polyolefin to form a cast extrudate, applying to the cast extrudate a solution or dispersion in a volatile vehicle of an amine sulphate having the general formula

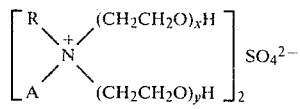

wherein x is a positive integer, y is zero or a positive integer, the sum of x and y is from 2 to 5, A is a hydrogen atom and when y is zero A may also be a lower alkyl group, and R is a univalent aliphatic radical containing from 8 to 22 carbon atoms, and thereafter heating and stretching the extrudate or orient it.

It is important that the sulphate of the amine is used in the present invention; use of the corresponding hydrochloride does not provide the oriented film with satisfactory antistatic properties. In the general formula above, it is convenient to use amine sulphates in which the sum of x and y is 2, A=H, and R is a mixture of aliphatic hydrocarbon radicals having 8 to 18, preferably 12 to 18, carbon atoms, particularly those which are derived from tallow or soya oil and are predominantly composed of hexadecyl, octadecyl and octadec-9-envyl (oleyl) radicals or derived from coconut oil and predominantly (e.g. >50 wt %) composed of dodecyl with a minor proportion (e.g. up to 20 wt %) of tetradecyl radicals. Examples of suitable amines from which amine sulphates may be prepared are sold as 'Ethomeen' T/12, 'Ethomeen' S/12 and 'Ethomeen' C/12 (Armour Hess Chemicals Limited).

The amount of amine sulphate present in the solution or dispersion applied to the cast extrudate depends, inter alia, on the level of antistatic properties required in the treated film, and can be readily determined by simple experimentation. Relatively high concentrations of amine sulphate are suitable, provided that the viscosity of the solution or dispersion is not increased to a level which adversely affects the mobility and spreadability thereof, and are advantageous in that the amount of volatile vehicle, which may adversely affect the film surface during evaporation therefrom, is kept to a minimum. In practice, the amine sulphate is conveniently employed at a concentration of up to about 60% by weight of the solution or dispersion, and is suitably employed at concentrations within a range of from 5 to 55%, preferably from 10 to 50%, by weight of the solution or dispersion. However, if, as hereinafter described, the antistatic influence of the amine sulphate is supplemented by the presence of an additional additive, the concentration of the amine sulphate may be reduced to a relatively low value, for example of the order of 0.25 to 2.5%, the total concentration of the amine sulphate and the additional additive being within the aforementioned range of up to 60% by weight of the solution or dispersion. Suitably, the concentration of the amine sulphate, alone or together with a supplementary additive, is selected so as to yield a polyolefin film exhibiting a surface resistivity, measured at 50% Relative Humidity, not exceeding 10 gigohms, and preferably less than 5.0 gigohms.

If desired, a mixture of two or more amine sulphates may be present in the applied solution or dispersion.

In a preferred embodiment of the invention there is provided on the film surface, in addition to the hereinbefore defined amine sulphate, a quaternary ammonium compound of general formula

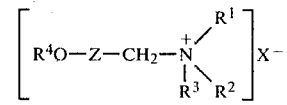

wherein each of $R^1$, $R^2$, and $R^3$, which may be the same or different, is a hydrogen atom or a lower alkyl radical, or $R^1$ and $R^2$ are each methylene groupings within a common five- or six-membered saturated heterocyclic ring, Z is a methylene group when $R^4$ is a hydrogen atom or an acyl radical containing up to 15 carbon atoms, or Z is a carbonyl group when $R^4$ is a hydrogen atom, and X is a univalent anion or an equivalent of a multivalent anion.

The lower alkyl radicals in the aforementioned formula of the quaternary ammonium compound are suitably methyl or ethyl radicals, while the anion X, which may be any anion, including a divalent ion, such as tartrate, is suitably a nitrate or chloride ion. A preferred quaternary compound is choline chloride of formula

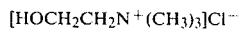

Choline chloride is a particularly advantageous agent for use in packaging films in that it is colourless, non-toxic, being used clinically in the treatment of cirrhosis of the liver and as a dietary supplement for poultry, substantially odourless, and an extremely effective antistatic agent.

Choline ester salts of general formula

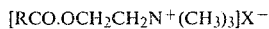

wherein R is a linear alkyl radical containing not more than 15 carbon atoms, and X is as hereinbefore defined, may also be employed. Suitable ester salts include N-(hexanoyl-oxyethyl)-trimethyl ammonium chloride.

Betaine,

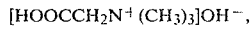

is another suitable quaternary ammonium compound.

The beneficial effect on antistatic properties achieved by using the quaternary ammonium compound in combination with the amine sulphate is believed to depend, inter alia, on the surfactant characteristics of the amine sulphate which ensure that the quaternary ammonium compound is uniformly distributed over the surface of the film. If desired, therefore, surfactant characteristics may be incorporated into the quaternary ammonium compound per se, for example by employing as at least one of the $R^1$, $R^2$ and $R^3$ groups of the hereinbefore defined general formula, a long chain aliphatic radical containing from 8 to 22 carbon atoms, or by employing a long counter anion such as a stearate grouping.

In practice, we have observed that adequate surfactant behaviour is achieved by the use of a relatively small amount of a long chain amine sulphate. Such salts are less effective, weight for weight, as antistatic agents than short chain quaternary ammonium compounds, such as choline chloride, and we therefore prefer to employ a solution or dispersion comprising a major proportion of the quaternary ammonium compound and a minor proportion of the amine sulphate. Conveniently, the weight ratio of quaternary ammonium compound to amine sulphate in the solution or dispersion applied to the cast extrudate is from 2:1 to 50:1, preferably between 25:1 and 30:1. As hereinbefore described, the combined concentration of quaternary ammonium compound and amine sulphate is desirably such, for example up to about 60% by weight of the applied solution or dispersion, that the viscosity of the solution or dispersion is not increased beyond a level at which a uniform distribution of the additives on the film substrate can be achieved.

Suitable polymeric materials for forming films according to the present invention include homo- and co-polymers of 1-olefins such as ethylene, propylene, butene-1, and 4-methylpentene-1. A preferred material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene.

Films are suitably formed from these materials by conventional extrusion techniques, a coextrusion technique being particularly suitable for the production of multiple-layer films, such as a polypropylene substrate having on at least one surface thereof a layer of a copolymer of propylene (80 to 95% by weight) with another alpha-olefin containing from 4 to 10 carbon atoms, such as butene-1, as described in British Pat. No. 1,452,424.

The films of this invention may be uniaxially oriented, but are preferably biaxially oriented by drawing in two mutually perpendicular directions in the plane of the film to impart strength thereto. Orientation of flat film may be effected by a stenter technique, while oriented tubular film is suitably produced by melt extruding the polymeric material in the form of a tube from an annular die, cooling the extruded tube, reheating and inflating the tube by the so-called "bubble" process to introduce transverse orientation, and simultaneously elongating the tube longitudinally to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

While the solution or dispersion of the amine sulphate, alone or together with the quaternary ammonium compound, may be applied between the orienting steps of a sequential drawing procedure, we prefer to apply the solution or dispersion to the cast, unoriented extrudate immediately prior to the reheating and orienting stage of the film-forming process. Evaporation of the volatile vehicle is therefore effected during the reheating operation, and the amine sulphate, and quaternary compound if included, becomes firmly bound to the film surface during orientation.

The amine sulphate, and quaternary ammonium compound if employed, may be applied to the film surface in any suitable solvent or dispersant vehicle, but for economy and ease of application we prefer to employ an aqueous, including an aqueous-alcohol, vehicle.

The films of the present invention may conveniently contain any of the agents conventionally employed in the manufacture of thermoplastic polyolefin films. Thus, agents such as dyes, pigments, lubricants, stiffening aids, anti-oxidants, anti-blocking agents, surface-active agents, slip aids, gloss-improvers, prodegradants, and ultra-violet light stabilisers may be employed.

Films according to the present invention may vary in thickness depending on the intended application, but usually we find that films having a thickness of from 2 to 150 microns are of general utility. Films intended for use in packaging operations are suitably within a thickness range from 10 to 50 microns.

Films according to the invention may be subjected to conventional after-treatments—for example, a corona discharge treatment to improve the bonding and print-receptive properties of the film surface.

The following examples illustrate the invention. Example 1 describes the preparation of amine sulphates and Example 2 describes the production of oriented polypropylene film having antistatic properties. Examples 5 to 8 and 10 relate to the production of antistatic multiple-layer films. Examples 3, 4 and 9 are comparative examples.

EXAMPLE 1

'Ethomeen' T/12 (Armour Hess Chemicals Limited) (4.9 g) was dispersed in water (15.0 cm$^3$) by stirring. Concentrated sulphuric acid (0.3 g) was dissolved in water (18.6 cm$^3$), and this solution was poured into the dispersion of 'Ethomeen' T/12. The mixture became very viscous and difficult to stir, becoming clearer and less viscous when all of the acid solution had been added. At this point there was still some undissolved matter; addition of small amounts of dilute sulphuric acid until pH 7 was reached resulted in the solution becoming clear.

Using equivalent proportions of sulphuric acid and 'Ethomeen' T/12 resulted in a solution of about pH 5.

The amine sulphate prepared from 'Ethomeen' T/12 was isolated from aqueous solution as a soft waxy yellow-brown solid.

Amine sulphates are similarly prepared from 'Ethomeen' S/12 and 'Ethomeen' C/12. In these compounds, referring to the general formula set out above, the sum of x and y is 2, A=H, and R is a mixture of predominantly straight-chain aliphatic hydrocarbon radicals of the approximate composition shown below.

| Composition of R | Amine sulphate prepared from 'Ethomeen' | | |
|---|---|---|---|
| | T/12 | S/12 | C/12 |
| Octyl | — | — | 7.0% |
| Decyl | — | — | 6.5% |
| Dodecyl | — | — | 53.0% |
| Tetradecyl | 3.0% | 1.0% | 19.0% |
| Pentadecyl | 0.5% | — | — |
| Hexadecyl | 29.5% | 24.0% | 8.5% |
| Heptadecyl | 1.0% | — | — |
| Octadecyl | 23.5% | 10.0% | 1.0% |
| Tetradecenyl (myristoleyl) | 1.0% | — | — |
| Hexadecenyl (palmitoleyl) | 3.0% | 1.0% | — |
| Octadecenyl (oleyl) | 37.0% | 49.0% | 5.0% |
| Octadecadienyl (linoleyl) | 1.5% | 15.0% | — |

EXAMPLES 2 TO 4

Using the procedure described generally in British patent specification No. 1 284 321, the disclosure of which is incorporated herein by reference, a cast tube of polypropylene of diameter 159 mm and about 1 mm thick was extruded downwards at the rate of 102 mm/s and passed into an oven where it was heated and inflated as a bubble giving a 7-fold draw in each direction, and finally heat-set as described in British patent specification No. 1,124,886 to produce film 20 μm thick. Just above the oven, an aqueous solution containing 14% by weight of 'Ethomeen' T/12 sulphate (of pH 7, prepared as described in Example 1) was applied to the surface of the cast tube by means of an aluminum tray shaped to fit around the cast tube and lined with lint. The solution was introduced into the tray by means of a peristaltic pump to given an average dry coat thickness on the oriented film of 0.022 μm. The weight of amine sulphate in the coating was 0.11% of the weight of the film (Example 2).

Film was made similarly using a 12% solution of 'Ethomeen' T/12 hydrochloride instead of the sulphate to provide the coating (Example 3).

The surface resistivity of both films was measured in comparison with uncoated film produced in similar fashion as a control (Example 4). The values, measured in gigohms per sample of film (square of 127 mm side), were as follows.

| 'Ethomeen' T/12 sulphate | 'Ethomeen' T/12 hydrochloride | Control (no coating) |
|---|---|---|
| 3.3 | 750 | 1380 |

(These are averages of duplicate measurements on each of four samples for the sulphate coating, five samples for the hydrochloride coating, and two samples for the control.)

These results show that the amine sulphate prepared from 'Ethomeen' T/12 provides the film with a much lower surface resistivity, and therefore much better antistatic properties, than the hydrochloride. Similar results are obtainable with the amine sulphates prepared from 'Ethomeen' S/12 and 'Ethomeen' C/12.

EXAMPLES 5 TO 9

Samples of an oriented polypropylene film having a coextruded layer of a propylene-butene-1 copolymer on each surface, prepared as described in Example 2 of British Pat. No. 1 452 424, were stretched taut using a ring clamp, and coated with an aqueous solution of either 1% by weight of amine sulphate alone or 1% by weight total of amine sulphate and choline chloride. The solution was placed in drops on the surface of each film sample and spread uniformly and very thinly by means of a Meier bar (pre-wetted with the solution) as applicator. The Meier bar was moved back and forth twice to leave a coherent liquid layer over the area of film. The coated film was dried in an oven at 105° C. for 5 minutes.

After equilibration of the film sample overnight, the surface resistivity of the coated area was measured in a simple apparatus in which one surface of the film was placed in contact with two metal strip contacts each 153 mm long and spaced 3 mm apart. This 3 mm length of film between the contact strips completed a circuit made up of a DC power supply (30 V battery) in series with a Sinclair Multimeter DM2 having a rated input impedance of 10 megohms. The voltage displayed on the Multimeter provided an arbitrary measure of the resistance of the film sample in the circuit.

The results including an approximate value for surface resistivity calculated from the displayed voltage are recorded in the accompanying Table.

TABLE

| Example | Amine Sulphate Material | wt % | Choline Chloride wt % | Surface Conductivity Volts | Surface Resistivity Gigohms |
|---|---|---|---|---|---|
| 5 | 'Ethomeen' T12 Sulphate | 1.0 | 0 | 2.41 | 0.5 |
| 6 | 'Ethomeen' T12 Sulphate | 0.75 | 0.25 | 13.80 | 0.051 |
| 7 | 'Ethomeen' T12 Sulphate | 0.5 | 0.5 | 15.62 | 0.040 |
| 8 | 'Ethomeen' T12 Sulphate | 0.25 | 0.75 | 15.81 | 0.039 |
| 9 | 'Ethomeen' T12 Sulphate | 0 | 1.0 | 15.21 | 0.042 |

These results demonstrate that films coated with a solution of 'Ethomeen' T/12 sulphate and choline chloride exhibit a much higher conductivity (lower resistivity), and therefore much improved antistatic properties, than films coated with 'Ethomeen' T/12 sulphate alone.

EXAMPLE 10

From a triple channel annular die were downwardly coextruded a propylene homopolymer, and a propylene/butene-1 random copolymer containing 14% by weight of butene-1, so as to form a cast polypropylene tube the internal and external surfaces of which were coated with a layer of the propylene/butene-1 copolymer. The combined output of homo- and co-polymer from the die was maintained at a rate of 4 kg per minute, and the the cast tube had a diameter of about 160 mm.

The coated polypropylene tube was cooled by passage over a mandrel within the tube, and externally quenched by passage through a water bath surrounding the mandrel, heated to stretching temperature in an infra-red oven, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form a flat film which was subsequently heat-set at a temperature of 135° C. on a roller system, as described in British Pat. No. 1 124 886. The inside surface of the film, i.e. that corresponding to the internal surface of the inflated bubble, was then exposed to a corona discharge. The thickness of the copolymer layer on each surface of the resultant film was about 1 micron, the substrate having a thickness of about 18 microns.

Immediately above the infra-red oven there was applied to the external surface of the cast tube at a rate of 9.6 ml/minute an aqueous solution of the following composition by weight:

'Ethomeen' T/12 sulphate (prepared as in Example 1): 0.4%

Choline Chloride: 10.8%

Water: 88.8%

The applied solution was wiped on to the tube by means of an applicator belt moving around, and in contact with, the peripheral surface of the tube, and the aqueous component of the solution was then evaporated as the tube passed through the infra-red oven.

Surface resistivity measurements, by the hereinbefore described technique, on the heat-set and discharge-treated film, at a Relative Humidity of 40%, yielded the following values:

inside surface: 14.2 gigohms outside surface: 16.3 gigohms

By comparison, a similarly prepared multiple-layer film which had not been treated with the aqueous antistatic solution yielded surface resistivity values, measured at 50% Relative Humidity, in excess of 1000 gigohms for each surface of the film.

I claim:

1. An antistatic polyolefin film having on at least one surface thereof (1) an amine sulphate of the formula

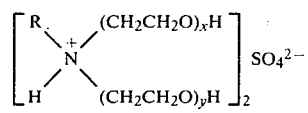

wherein x is a positive integer, y is a positive integer, the sum of x and y is from 2 to 5, and R is a univalent aliphatic radical containing from 8 to 22 carbon atoms and in addition thereto (2) a compound of the formula

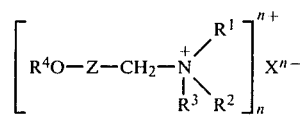

wherein each of $R^1$, $R^2$, and $R^3$ which be the same or different, is a hydrogen atom or a lower alkyl radical containing from 1 to 6 carbon atoms, or $R^1$ and $R^2$ are each methylene groupings within a common five- or six-membered saturated heterocyclic ring, Z is a methylene group when $R^4$ is a hydrogen atom or an acyl radical containing up to 15 carbon atoms, or Z is a carbonyl group when $R^4$ is a hydrogen atom, and X is an anion of valency n.

2. A film according to claim 1 wherein the quaternry ammonium compound is choline chloride.

3. A film according to claim 1 wherein the film is a multiple-layer film having a substrate layer of a propylene polymer and, on at least one surface of said substrate, a layer of a copolymer of propylene with from 5 to 20% by weight of the copolymer of another alpha-olefin containing from 4 to 10 carbon atoms in its molecule.

* * * * *